Feb. 11, 1936.   R. B. LEWIS   2,030,457
UNIVERSAL TESTING MACHINE
Filed Oct. 12, 1932   4 Sheets-Sheet 3
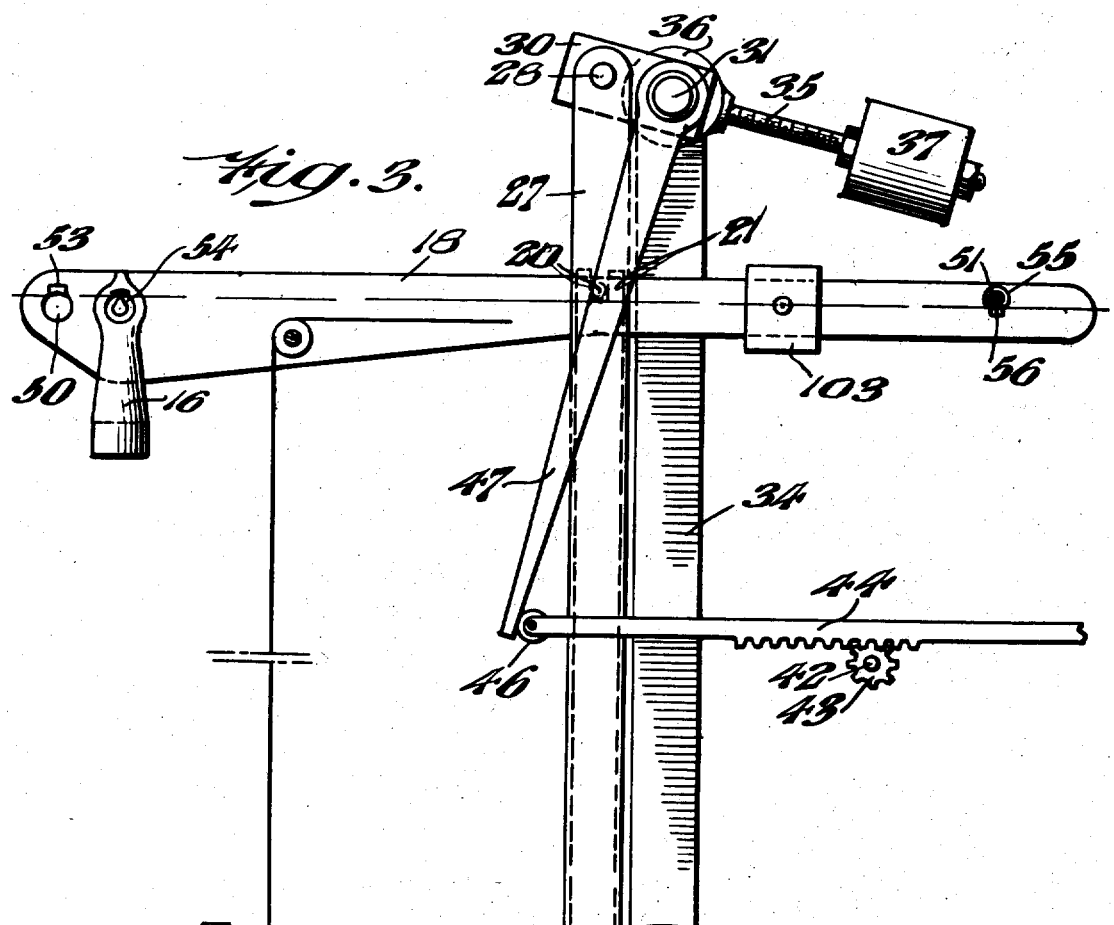
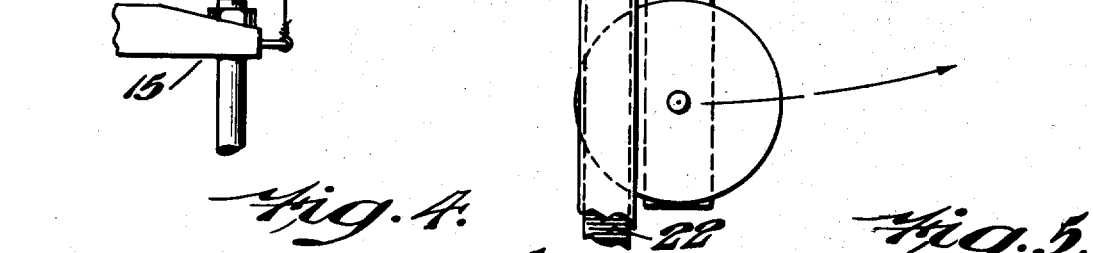
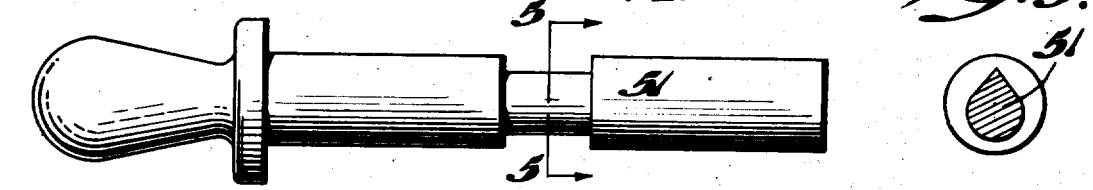
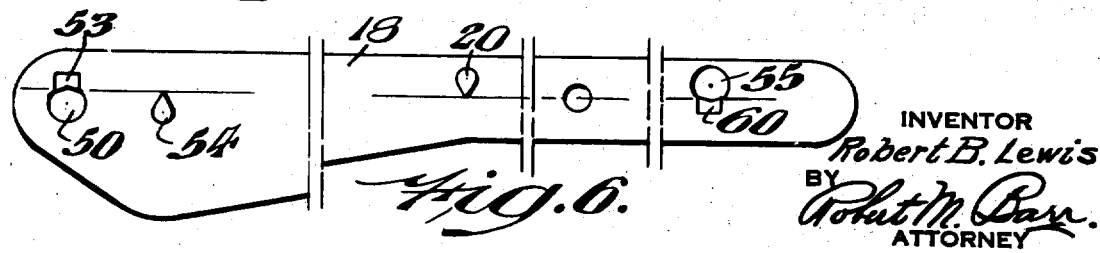

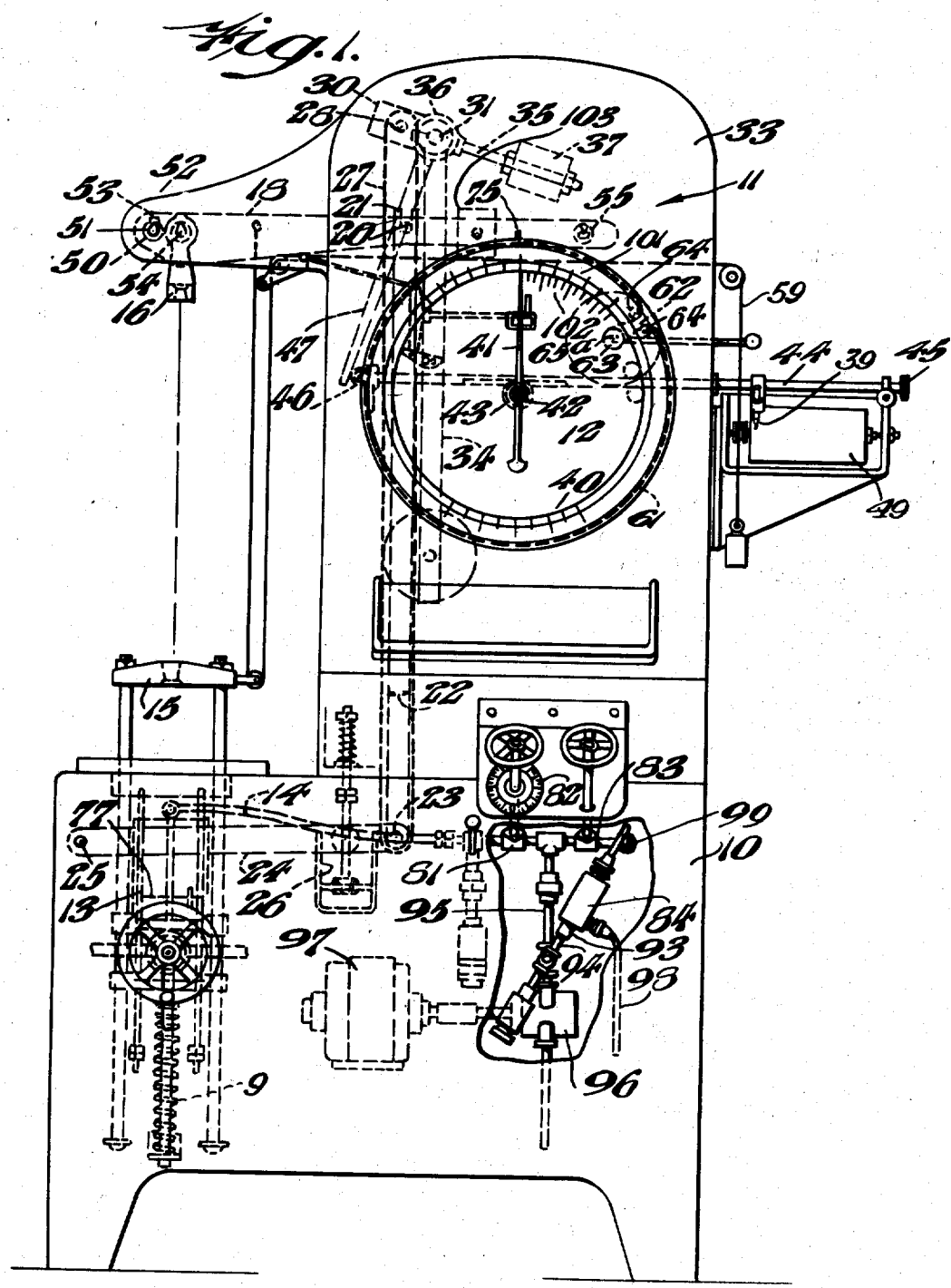

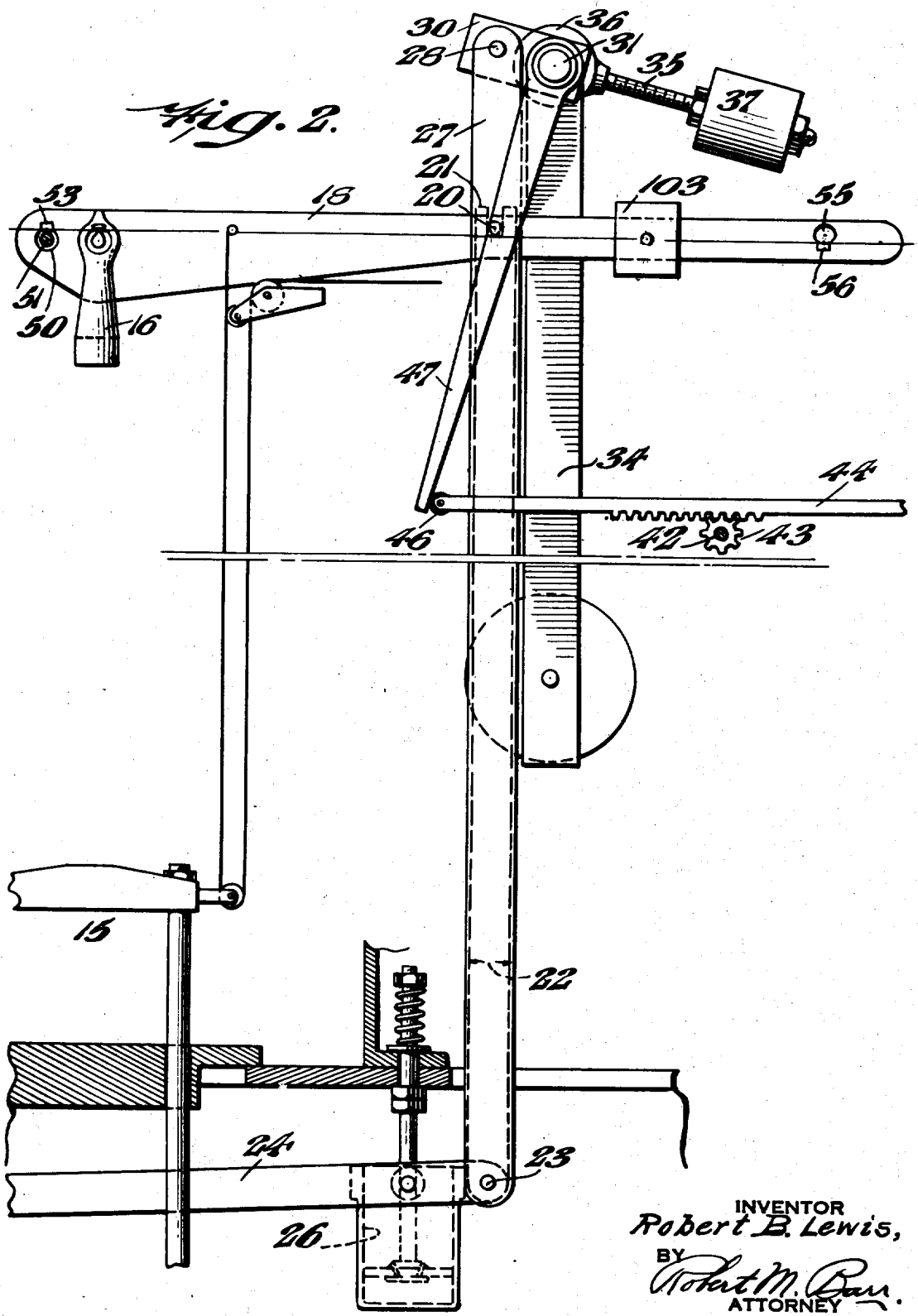

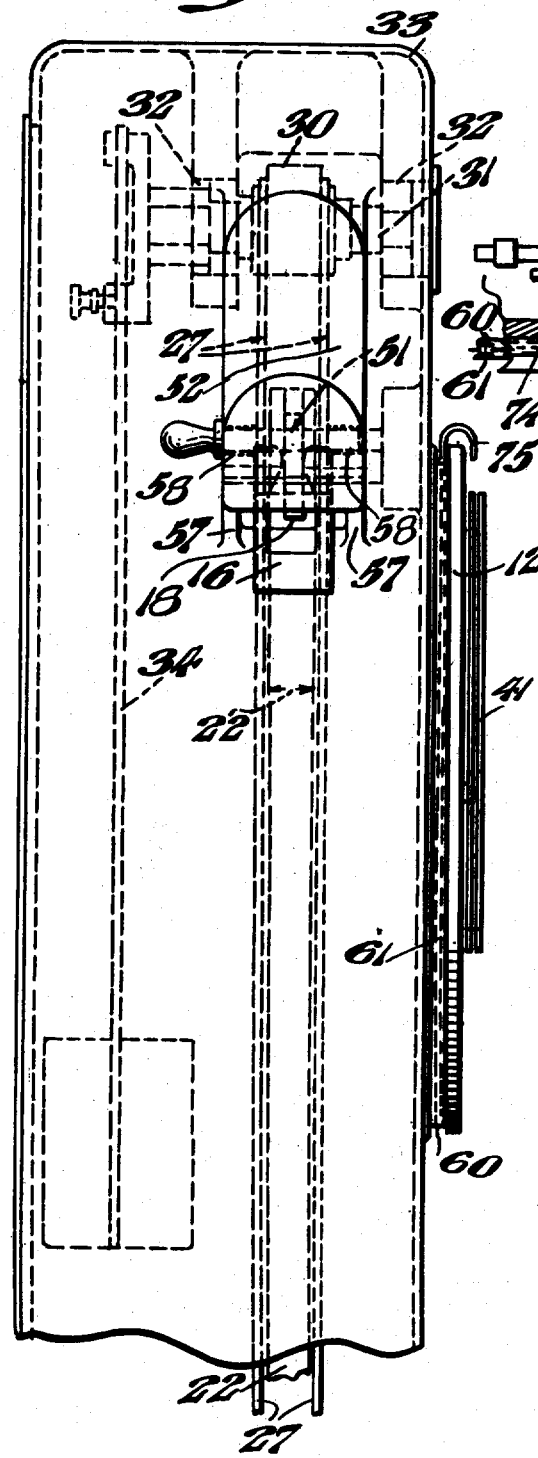
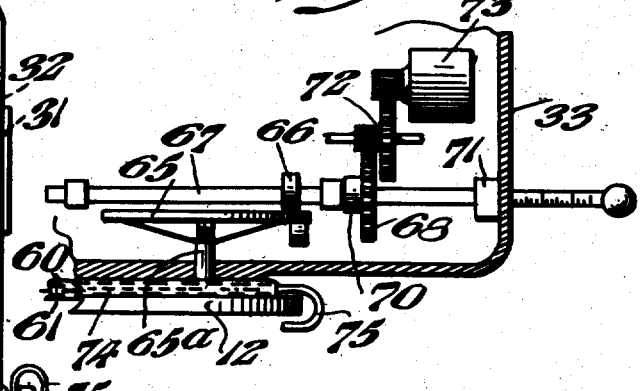
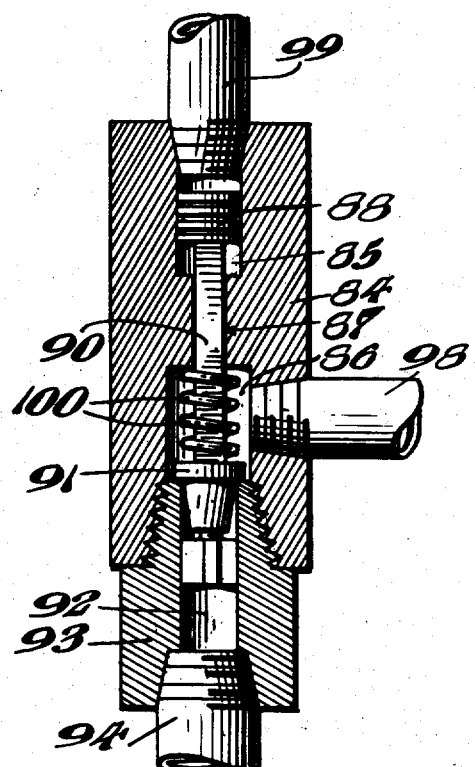

Patented Feb. 11, 1936

2,030,457

UNITED STATES PATENT OFFICE 2,030,457

UNIVERSAL TESTING MACHINE

Robert B. Lewis, Philadelphia, Pa., assignor to Tinius Olsen Testing Machine Company, Philadelphia, Pa., a corporation of Pennsylvania Application October 12, 1932, Serial No. 637,394

5 Claims. (Cl. 265—16)

The present invention relates to testing machines and more particularly to a combined low and high capacity weighing machine.

In weighing machines for testing purposes and particularly those making use of the accuracy possessed by a pendulum in indicating loads it has heretofore been necessary to change the pendulum weight, that is substitute one weight for another according to variations in capacity. Thus when the machine is operated with a lightened pendulum a number of disturbing factors are introduced, among which may be mentioned the increased effect of the friction due to the lessened capacity of the pendulum to overcome outside disturbances when so lightened. Also the weight of the pendulum forms a very definite link with its associated parts to produce accurate indication and a change of that weight while maintaining the associated parts unchanged at once introduces errors in the indication.

Some of the objects of the present invention are to provide an improved testing machine; to provide a testing machine wherein both low and high capacity tests can be made with equal accuracy upon the same machine; to provide a testing machine wherein the sensitivity of the indicating scale remains constant regardless of the applied force; to provide a testing mechanism wherein variation of parts one with respect to another, such for example, as change of pendulum weight becomes unnecessary when changing the capacity of the machine; to provide a mechanism wherein the maximum range of a testing machine scale can be altered without affecting the accuracy thereof or disturbing adjuncts of the weighing mechanism; to provide means for varying the lever system of a testing machine without impairing the effectiveness of the indicating scale; to provide an improved control valve for maintaining a uniform rate of travel of the load applying means; to provide means for ensuring a constant load in a testing machine; to provide a device for indicating the rate of loading of a testing machine and whereby a definite constant loading rate can be maintained; and to provide other improvements as will hereinafter appear.

In the accompanying drawings Fig. 1 represents a front elevation of a testing machine embodying one form of the present invention; Fig. 2 represents an enlarged detail of the lever system shown in the machine of Fig. 1 as set to function as a lever of the third class; Fig. 3 represents the same lever system as set to function as a lever of the second class; Fig. 4 represents a detail in side elevation of one form of fulcrum pin; Fig. 5 represents a section on line 5—5 of Fig. 4; Fig. 6 represents a detail in side elevation of the variable fulcrum lever; Fig. 7 represents a side elevation of that portion of the machine which includes the lever system indicating scale, and the constant loading device; Fig. 8 represents a detail of one form of mechanism for obtaining a predetermined rate of loading of the machine; and Fig. 9 represents a longitudinal section of an improved valve for causing the load applying mechanism to travel at a constant rate regardless of load variation.

Referring to the drawings and more particularly to Fig. 1, one form of the present invention is shown as applied to a pendulum type of universal testing machine consisting generally of a base unit 10 mounting the load applying mechanism, a weighing unit 11 mounted thereon, and including as a part thereof the load indicator 12. In the present instance the weighing unit 11 is assembled in conjunction with a load applying mechanism of the hydraulic type wherein the pressure fluid is supplied to the cylinder 13 from conduit 14 in order to cause the load applying crosshead 15 to move and transmit the pull through the test piece to the yoke 16. The present invention is not limited, however, for use with any particular kind of load applying mechanism.

For transmitting the load to the weighing pendulum 34, a lever arm 18 is provided, which is fulcrumed in a novel manner later to be described, carrying a laterally projecting pin 20 seating in the slotted end 21 of a tubular rod 22. The lower end of this rod 22 is connected by a pivot 23 to a fulcrum arm 24 which is fulcrumed at 25 and under control of a dash-pot 26. The pivot 23 also connects the arm 24 to two links 27 which are spaced by the rod 22, and rise alongside thereof for connection through a pivot 28 with a throw arm 30 keyed or otherwise made fast to a rock shaft 31. Suitable bearings 32 are carried by the casing 33 to journal the shaft 31 and the latter mounts the pendulum 34 by which the applied force is measured. A threaded rod 35 projects from a hub 36 attached to the shaft 31 and a counter weight 37 is threaded upon the rod 35 for accomplishing the zero setting operation.

In order to indicate the throw of the pendulum 34 the indicating dial 12 is provided having a circular scale 40 graduated in terms of applied force. A pointer 41 is rotatably mounted to turn with a spindle 42 at the center of the dial 12 and the spindle 42 is arranged to be driven by a pinion 43 meshing with a reciprocable rack bar 44. This rack bar 44 is suitably supported and guided at the rear of the dial 12 and projects at one end to the exterior of the casing 33 where it terminates in a knurled knob 45 for manual setting. The opposite end of the bar 44 terminates in a roller 46 located in the path of movement of an operating arm 47 which receives its motion from the pendulum shaft 31. When the pendulum 34 is properly balanced to a zero setting the arm 47 rests against the roller 46 sufficiently to hold the pointer 41 to the zero reading of the scale 12. The bar 44 also serves to move a pencil or stylus 38 lengthwise of a cylinder 49 for carrying a recording chart, the cylinder 49 being rotated by a cable 50 arranged to follow the movement of the cross head 15. This is any well known form of stress strain recording apparatus, such for example as shown in United States Letters Patent No. 1,855,613.

For mounting the lever arm 18 so that it functions as a lever of the third class, as shown in Fig. 2, for use when using the machine for relatively high capacity tests, a transverse hole 50 is provided through the arm 18, at the opposite side of yoke 16 from the pendulum 34, for the reception of a knife edge pin 51. This pin 51 is removably mounted in a bifurcated extension 52 of the casing 11 and its knife edge coacts with a wear insert 53 in the arm 18. Since the applied force acts through the yoke 16 to the fixed knife edge 54 projecting from both sides of the arm 18, it will be seen that the pin 51 becomes the fulcrum of a third class lever which reacts through the pin 20 to cause a definitely proportioned movement of the pendulum. The swing of the pendulum in turn is transmitted through the rack 44 and pinion 43 to turn the pointer clockwise and produce an accurate indication of the applied load. Thus with the lever 18 fulcrumed as a lever of the third class and functioning for loads of say one thousand pounds, the ratio of the lever acting upon the pendulum 34 will result in a pointer movement on the scale dial 12 from zero to one thousand pounds for two revolutions of the pointer 41. Hence the pound graduations of the scale are relatively widely spaced so that each position of the pointer is unmistakably indicated.

For mounting the lever 18 so that it becomes a lever of the second class, as shown in Fig. 3, to give a ratio adapted for low capacities, such as from zero to one hundred pounds, a transverse hole 55 is provided through the end of the lever 18 on the opposite side of the pin 20 from the yoke 16. A wear insert 56 is located on the lower portion of the hole 55 to support the knife edge of the pin 51. The frame 33 is provided with suitable ribs 57 to receive the end of the lever 18 between them, and holes 58 are respectively formed in the ribs 57 to register with the hole 55 of the aforesaid lever. Thus the pin 51 can be inserted through the holes 55 and 58 so that it becomes a fixed fulcrum about which the lever 18 can swing under the influence of the load applied on the yoke 16. The lever 18 now becomes a lever of the second class ready to function for low capacity loads and the ratio of the lever acting upon the pendulum 34 will result in a pointer movement on the dial 12 from zero to one hundred pounds. Preferably a full swing of the pendulum 34 on this ratio will cause two revolutions of the pointer to give a maximum reading of one hundred pounds and hence the desired legible readings of the graduations are obtained.

For the purpose of obtaining any desired rate of loading upon the machine, the rear face of the dial 12 carries a circular track 60 upon which an endless chain 61 or like belt is arranged to travel. The track 60 is interrupted at one point 62 to permit the chain 61 to pass around a driven sprocket or wheel 63 rotatably mounted within the circumference of the track 60. Idlers 64 guide the chain 61 through the opening at the point 62 and maintain the necessary tension thereon. Motion is transmitted to the driven sprocket 63 by a spindle 65ᵃ carrying a disc 65 which is frictionally driven by a wheel 66 carried by a longitudinally shiftable shaft 67 having a gear 68 keyed thereon to allow free relative sliding of the shaft 67. A bearing 70 supports the shaft 67 and holds the gear 68 against movement with the shaft when the latter is shifted lengthwise. A second bearing 71 is provided in the casing 33 where the shaft 67 projects conveniently for manual setting. Preferably the protruding shaft end is graduated in terms of track speed corresponding to the rate of loading upon the machine and hence the shaft can be readily positioned to give a predetermined loading rate. The gear 68 is actuated through a suitable gear reduction 72 from a constant speed motor 73 which is suitably mounted within the casing 33. A band 74 of spring material is tensioned about the chain 61 to ride therewith as a complete unitary circumference driven by the chain 61 to travel adjacent to the periphery of the dial 12, but preferably concealed behind said dial. A finger 75 is fixed to said band 74 and is curved outwardly therefrom to straddle the margin of the dial 12 and thus become visible from the front of the machine so that its rate of travel can be used for bringing the movement of the dial to the same speed. In other words the finger 75 acts as a pacer for setting the load applying mechanism so that it applies the load at a known rate.

For applying the load to the test piece it is preferable to employ a hydraulic mechanism, the details of which are well known in the art and consisting generally of a cross-head 15 moved by a plunger 77 operating in a cylinder 13 under the action of a pressure fluid supplied by a pipe 14. This is the standard hydraulic operated pressure applying cylinder employing a coil spring means 9 for returning the plunger 77 to its initial or zero position. In the present instance this supply pipe 14 is controlled by a rate flow valve 81 operating in conjunction with a rate flow indicating dial 82, and also by a supplemental valve 83. In connection with this hydraulic mechanism the present invention comprehends a new and novel constant flow control valve by means of which it is possible to obtain a rate of cross-head movement which for all practical purposes is substantially constant throughout the loading range of the machine. In the present instance the body 84 of this valve is provided with two axially disposed bores 85 and 92 opening at opposite ends of the body and intercommunicating by a bore 87 of reduced diameter and a chamber 88 of increased diameter. The bore 85 is preferably larger than the bore 92 in order to give a desired differential action and is arranged to receive a piston 88 which is supported on a stem 90 of a valve part 91. This valve part 91 is arranged to control the passage 92 formed in a fitting 93 which is screwed into the valve body at one end and at its other end is connected to and communicates with a pipe 94 leading from the discharge pipe 95 of a pump 96. The pump 96 as here shown is of the rotary type driven by a motor 97. The fitting 93 provides a seat for the valve part 91 and when the valve is open pressure fluid from the pump 96 enters the bore 92 and can escape therefrom back to the pump reservoir by way of the chamber 86 and by-pass outlet 98. The bore 85 communicates by a pipe 99 leading to the pressure cylinder 13 and is subjected to the pressure from the pump 96 when the machine is operating.

In order to set the control valve for the required differential, a coil spring 100 is provided which encircles the stem 90 within the bore 86 and is compressed between the valve part 91 and the end of the bore 86. The spring tension as set is such as to produce the proper differential for cross-head motion at zero load. As pressure increases in the cylinder 13 through the increase in load, the pressure of the load fluid upon the valve part 91 at one end and upon the piston 88 at the other end results in a differential action which assists and ensures the spring 100 in maintaining the correct differential for uniform rate of flow into the cylinder whereby a substantially constant cross-head motion is obtained.

In connection with the indicator 12 it should be noted that while the pointer 41 is actuated by the weighing mechanism under both low and high capacity tests, the indicating dial is provided with two sets of scales or graduations 101 and 102, the former being arranged to be read when the pointer 41 is responding to low capacity loads and the latter to be read when the pointer 41 is responding to high capacity loads. It is to be understood that this manner of calibrating the dial with two sets of scales is merely one way of obtaining the results, as probably in practice each dial will be a two faced dial having a low capacity scale on one side and a high capacity scale on the other side, whereby the dial can be reversed when a change from low capacity testing to high capacity testing and vice-versa is desired. Where a dial of the aforesaid two faced type is used, a reversal is accomplished by removing the pointer 41 so that the dial clamping means can be released and then lifting the dial forwardly from the spindle 42, turning it over to expose the opposite face and then replacing it in this reversed position. In the operation of the machine of the present invention it will be assumed first that the test pieces are to be subjected to low capacity loads and therefore the lever system by which the weighing mechanism is operated is arranged as a lever of the second class by inserting the pin 51 in the hole 55 so that the fulcrum is on the end of the lever opposite to where the load is applied. Under these conditions loads ranging from zero to one hundred pounds will be applied to the test piece and transmitted through the yoke 16 to the lever 18 and thence to the weighing mechanism, which in turn causes the pointer 41 of the indicator to show upon the scale of relatively wide graduations an accurate indication of the load applied. When the test pieces are to be subjected to high capacity loads up to one thousand pounds or more the lever system is converted into one of the third class by removing the pin 51 and inserting it in the hole 56 at the opposite end of the lever 18 where it is supported by the frame and becomes a new fulcrum so changing the lever system as to bring the weighing mechanism into operation with the indicator, so that the latter shows in well spaced graduations the high capacity applied loads. In connection with the lever 18 it should be noted that a counter-balance weight 103 is attached at the proper location on the lever 18 to bring about a true balance of the lever about the pin 20. This eliminates any error which might appear due to the unbalanced weight of the lever 18. Also the balanced condition of the lever 18 about the pivot pin 20 establishes a constant zero setting of the indicator and therefore any change from one lever system to the other requires no resetting of the indicator to zero. It will thus be evident that the fulcrum point can be immediately changed from one place to another without generally disturbing the system or balance of the parts.

For accurate testing it is desirable that the cross-head 15 apply its load to the test piece not only uniformly but at a known rate of application and that this may be accomplished the control valve 84 with its differential action comes into play since by setting either of the hand control valves 81 or 83 the rate of flow of the pressure fluid to the hydraulic cylinder can be accurately regulated. That this rate of flow will remain practically constant is evident from the fact that both ends of the differential member 90 are subjected to the pressure of the pump discharge and through the difference in the diameters of the piston 88 and valve 91, this pressure functions to maintain substantially the predetermined differential relation, which is initially obtained by the setting of the spring 100. In the operation of the valve 84 the spring 100 is initially set for no load conditions in the flow of fluid from the pump 96. To regulate the loading pressure and establish a predetermined rate of loading, the control valve 83 is closed and the regulating valve 81 opened until the desired rate is established. With this rate 35 fixed and the cross head 15 moving under the applied load any increase in back pressure is transmitted by the pipe 99 to the piston 88 so that the pressure of the spring 100 is proportionately increased and a definite difference of pressure is maintained between the bore 92 and the chamber 86. The differential piston construction becomes an automatic compensating means for the increase in fluid friction under load application and hence the rate of loading result is free from error introduced by fluid friction. The desired rate of loading is obtained by starting the motor 73 and adjusting the variable speed disc 65 so that the rider or pacer 75 travels about the circumference of the dial at the rate selected for applying the load. With this pacer 75 travelling at the desired rate, one or the other of the valves 81 or 83 can then be brought into operation to so control the pump discharge that the movement of the cross-head will be reflected in the pointer 41 and the latter therefore made to become coincident in its motion with the pacer 75.

It will now be apparent that a complete unitary testing machine has been devised which is universal in character, and wherein an indicator is under the control of a weighing system which is actuated by two lower systems, one of which systems is responsive to loads of low capacity and the other to loads of high capacity. These lever systems are so arranged that they can be selectively associated with other weighing mechanism in accordance with the requirements of the machine, and therefore not only a wide range of load capacity can be used with the machine, but whether the capacity used is a high or a low one the same dial functions accurately and legibly to record the correct applied load.

This application is related to application Ser. No. 690,993 for Improvement in fluid pressure regulator and application Ser. No. 690,994 for Improvement in speed comparing device.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. In a testing machine, the combination of a weighing system including a load responsive lever, an indicator responsive to a selected load condition applied to said system and responsive as a function of another load condition, means including a removable fulcrum pin for varying the fulcrum of said lever to conform to one or another of said load conditions, means for operating said indicator, means forming a point of connection between said lever and said indicator means, and means to maintain said lever balanced about said point of connection whereby the same zero setting of said indicator is maintained for both conditions.

2. In a testing machine, the combination of a weighing system including a load responsive lever, an indicator, means for operating said indicator, means forming a point of connection between said lever and indicator operating means, means for applying a testing load to said lever, means providing two fulcrum saddles for said lever, a single removable knife edge for selecting one or the other of said fulcrum saddles whereby the operating effect of said lever can be varied at will for different capacities, and means to maintain said lever balanced about said point of connection whereby the same zero setting of said indicator is maintained for all capacities.

3. In a testing machine, an indicator, means including a weighing pendulum for operating said indicator, a load responsive lever arranged to operate said pendulum and having two holes therein, means forming a point of connection between said lever and said indicator means, means for applying a load to said lever between said holes, a fixed frame, means for pivotally connecting said lever to said frame through one or the other of said holes for changing said lever system at will, and means to maintain said lever balanced about said point of connection whereby the same zero setting of said indicator is maintained for all lever systems.

4. In a testing machine, an indicator, means including a weighing pendulum for operating said indicator, a load responsive lever arranged to operate said pendulum and having two holes therein, means forming a point of connection between said lever and said indicating means, means for applying a load to said lever between said holes, a fixed frame, a fulcrum pin for entering one or the other of said holes and engaging said frame whereby said lever system can be changed at will, and means to maintain said lever balanced about said point of connection whereby the same zero setting of said indicator is maintained for all lever systems.

5. In a testing machine, an indicator, means including a weighing pendulum for operating said indicator, a frame having two fulcrum locating holes therein, a lever having holes therein to register respectively with said fulcrum holes, means forming a point of connection between said lever and said indicator means, means for applying a load to said lever between said lever holes, a pin provided with a knife edge for entering either pair of registered holes whereby the system of said lever can be changed at will, and means to maintain said lever balanced about said point of connection whereby the same zero setting of said indicator is maintained for all lever systems.

ROBERT B. LEWIS.